United States Patent
Lockhart et al.

(12) 
(10) Patent No.: US 6,189,035 B1
(45) Date of Patent: Feb. 13, 2001

(54) METHOD FOR PROTECTING A NETWORK FROM DATA PACKET OVERLOAD

(75) Inventors: Thomas Wayne Lockhart, Vancouver; Karl Anthony Reardon, Surrey, both of (CA)

(73) Assignee: Motorola, Schaumburg, IL (US)

(*) Notice: Under 35 U.S.C. 154(b), the term of this patent shall be extended for 0 days.

(21) Appl. No.: 09/075,289

(22) Filed: May 8, 1998

(51) Int. Cl.[7] .................................................. G06F 13/36

(52) U.S. Cl. .......................... 709/229; 709/226; 709/246; 370/230; 370/231; 370/232; 370/233; 370/234; 370/235; 370/236; 370/237; 370/238

(58) Field of Search .................................. 709/229, 246, 709/226; 370/230–238, 224

(56) References Cited

U.S. PATENT DOCUMENTS 5,835,726 * 11/1998 Shwed et al. ........................ 709/229
5,914,936 *  6/1999 Hatono et al. ....................... 370/230

* cited by examiner

Primary Examiner—Dung C. Dinh
Assistant Examiner—Hieu C. Le

(57) ABSTRACT

An internal network (16) is protected from being overloaded by an excessive number of data packets that originate from a source in an external network (10). In a preferred embodiment, data packet gate (20) receives each incoming data packet and determines whether it came from a trusted source. If it was not from a trusted source, and the number of data packets received recently from the same source exceeds a threshold, then data packets from that source are rejected. Preferably, when incoming data packets from all non-trusted sources exceed another threshold, additional data packets from all non-trusted sources are rejected.

3 Claims, 4 Drawing Sheets

METHOD FOR PROTECTING A NETWORK FROM DATA PACKET OVERLOAD

FIELD OF THE INVENTION

This invention is directed to the processing of data packets that originate from an external network, such as the Internet, and are directed to users operating in an internal network.

BACKGROUND OF THE INVENTION

If a large number of data packets is directed from an external network to users in an internal communication network, the internal network can become overloaded. This problem will be explained using the Internet as an example of an external network that is capable of sending an excessive number of data packets that can seriously hinder the operation of an internal network such as a radio data network or a paging network.

Users of the Internet are now able to send messages to individual radio receivers that operate in a radio network. The message starts at an Internet source, and is transmitted in the form of data packets to a radio network. The radio network transmits the received data packets to the addressee's radio receiver.

If an Internet source sends an excessive number of data packets to receivers in the radio network, the outbound channels of the radio network can become congested, and large bills can be run up for the addressed radio receivers. Such an attack on the radio network can be purposeful or inadvertent, such as by a sender of junk mail. In either event, the result is degraded service in the radio network, and large bills that are unlikely to be paid by unhappy recipients of the data packets.

A firewall between the Internet and the radio network is the traditional mechanism for protecting the radio network from an assault of the type described above. However, a conventional firewall also restricts arbitrary access by legitimate users. Moreover, some forms of such an attack, such as junk e-mail, can be successful, even through a firewall. Conventional packet filtering may protect the network, but it also can restrict access by legitimate users. Similar problems arise with other forms of external networks which are capable of sending large numbers of data packets to users in an internal network.

DESCRIPTION OF THE PREFERRED EMBODIMENT

Figure 1:
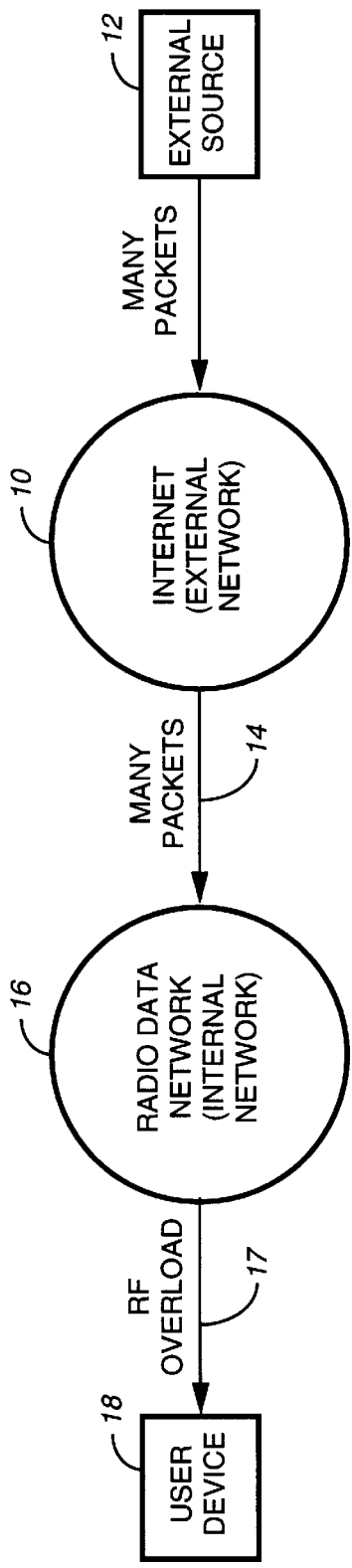
FIG. 1 illustrates a conventional communication system in which an external network, such as the Internet, transmits an excessive number of data packets to an internal network, resulting in an RF (Radio Frequency) overload in the case where the internal network is a radio data network.

Referring to FIG. 1, an external network 10, such as the Internet, receives data packets from an external source 12.

The external source 12 is typically a personal computer, a computer server or other device capable of generating data packets. All such devices are sometimes referred to herein as packet sources.

The data packets (not shown) typically include at least a header and an information segment. The header includes information such as the source address, i.e., the address of the packet source (external source) 12, the address of the destination, routing information, etc. The information segment includes all or part of a message that is to be sent to the intended destination.

As discussed above, the external source 12 may desire to send a large number of data packets to one or more addressees in another network. If the addressees are part of a radio data network, the outbound channels of the radio network could become congested and thereby seriously degrade network operation.

In FIG. 1, the data packets generated by the source 12 are sent via the Internet 10 and a communication link 14 to an internal network 16 such as a radio data network. The term "internal network", as used herein, means a communication network that serves a number of users and transmits information without restriction from one user to another user; the internal network can also transmit information between its internal users and other networks that are separate from the internal network. Such other networks are referred to herein as "external networks" because they are part of the "outside world" as viewed from the perspective of the internal network 16.

Data packets received by the internal network 16 are transmitted via a link 17 to an addressed user device 18. In the case where the internal network is a radio data network, the user device may be a radio receiver that communicates with the internal network via an RF link. Other forms of user devices include modems, personal computers, and other devices that can communicate with the network 16 via a link 17 that may be RF, cable, or any other suitable form of communication link.

Figure 2:
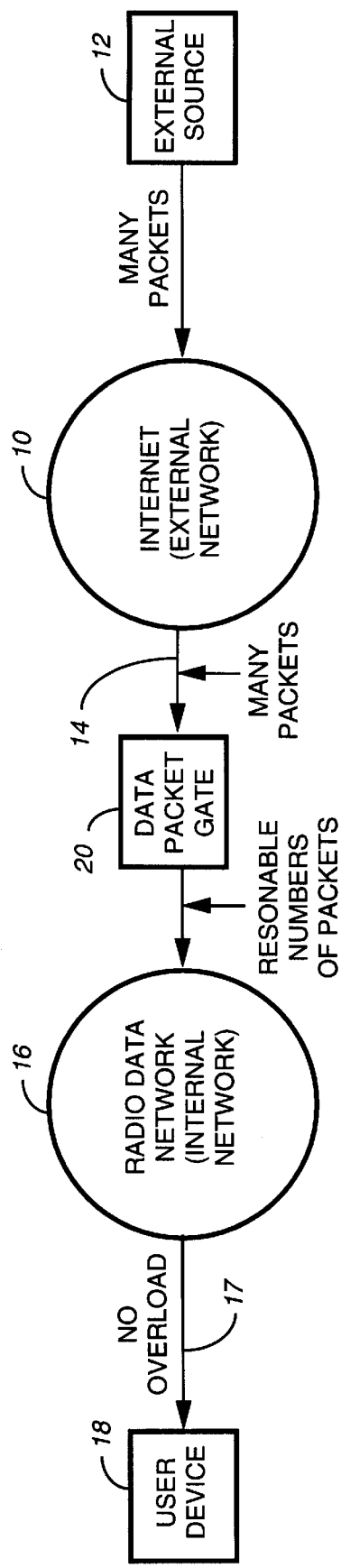
FIG. 2 illustrates the use of a data packet gate, in the system of FIG. 1, for selectively limiting the number of data packets that pass through to the internal network in accordance with the invention.

The conventional arrangement shown in FIG. 1 can permit an RF overload to occur in the link 17 when an excessive number of data packets are received from the external network 10. This problem is solved according to the invention by establishing a data packet gate 20 (FIG. 2) in the link 14 between the external network 10 and the internal network 16, determining whether an incoming data packet is on a list of selected (trusted) sources, and, if not on the selected list, rejecting the data packet if the number of data packets from that source is greater than a threshold number. All data packets received from sources on the select list are passed through to the internal network. In this manner, the number of incoming data packets that are passed to the internal network is limited to a number which the internal network can handle without unduly degrading its operation. This mode of operation of the data packet gate 20, and other features of its operation, are described more fully below.

Figure 3:
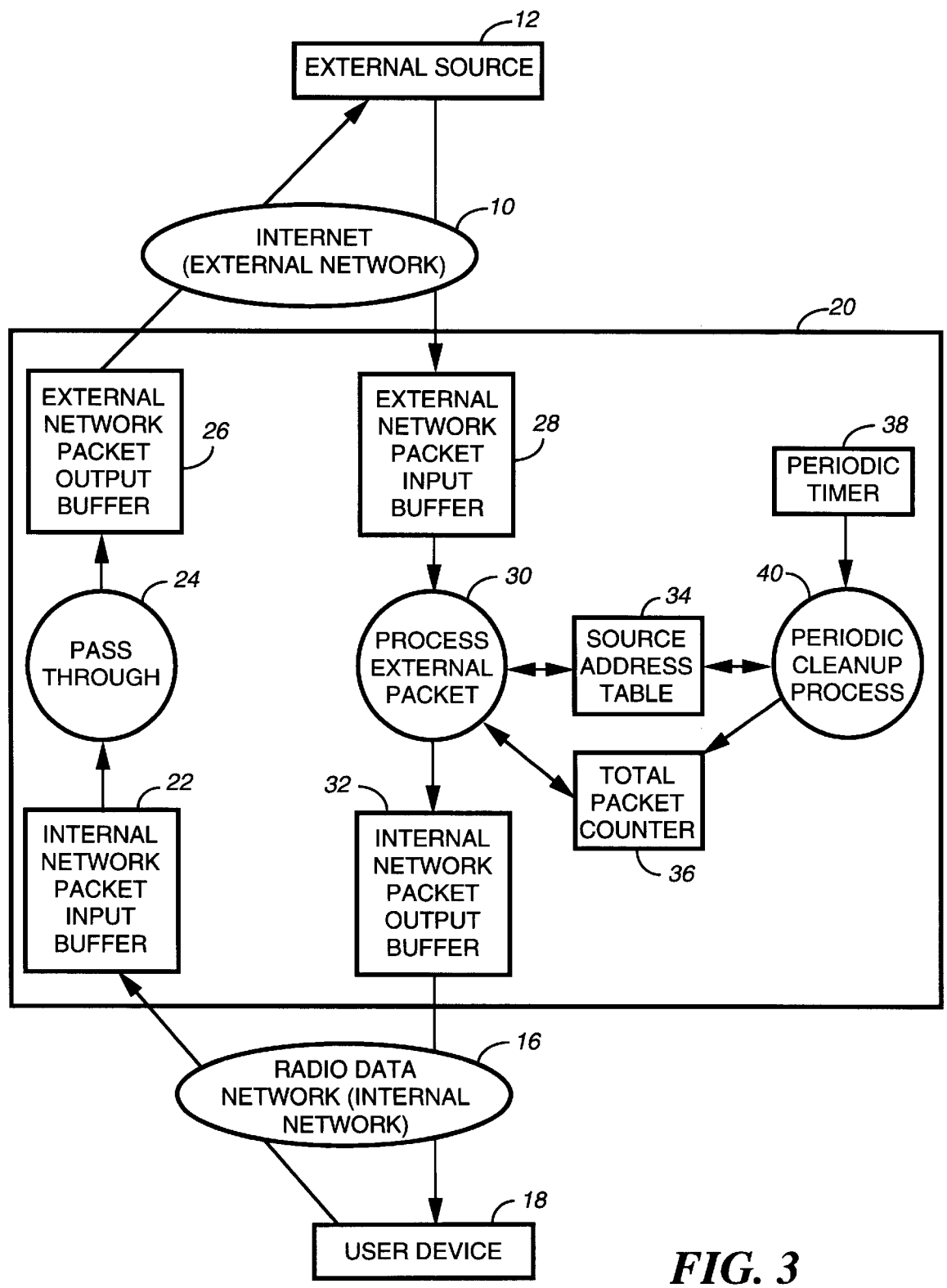
FIG. 3 is a block diagram showing more detail of the data packet gate.

Referring now to FIG. 3, the data packet gate 20 includes an input buffer 22 that receives data packets from the internal network 16. After being buffered in a conventional manner, the data packets are passed through at 24 to a conventional output buffer 26 and, from there, transmitted to the external network 10 for distribution to the proper external source 12. Thus, data packets that originate from the internal network 16 are transmitted to their destination in the external network without limitation or modification.

Data packets originating in the external network 10 are received by a conventional input buffer 28 and then subjected to an external packet process 30 that is described in detail below. Suffice it to say that the process 30 rejects selected incoming data packets to avoid congestion in the internal network. After processing, the data packets that are to be admitted to the internal network are applied to a conventional output buffer 32. The buffered data packets are coupled to the input of the internal network 16 which distributes the packets to the proper user device 18 according to the destination address that is included in each data packet.

The data packet gate 20 also includes a source address table 34, a total packet counter 36, and a periodic timer 38 that starts a periodic cleanup process 40. The functions of elements 34, 36 and 38 are described below in connection with FIGS. 4 and 5. The processes 30 and 40 are preferably executed by a conventional microprocessor or computer that is programmed as shown by the flow charts of FIGS. 4 and 5.

Figure 4:
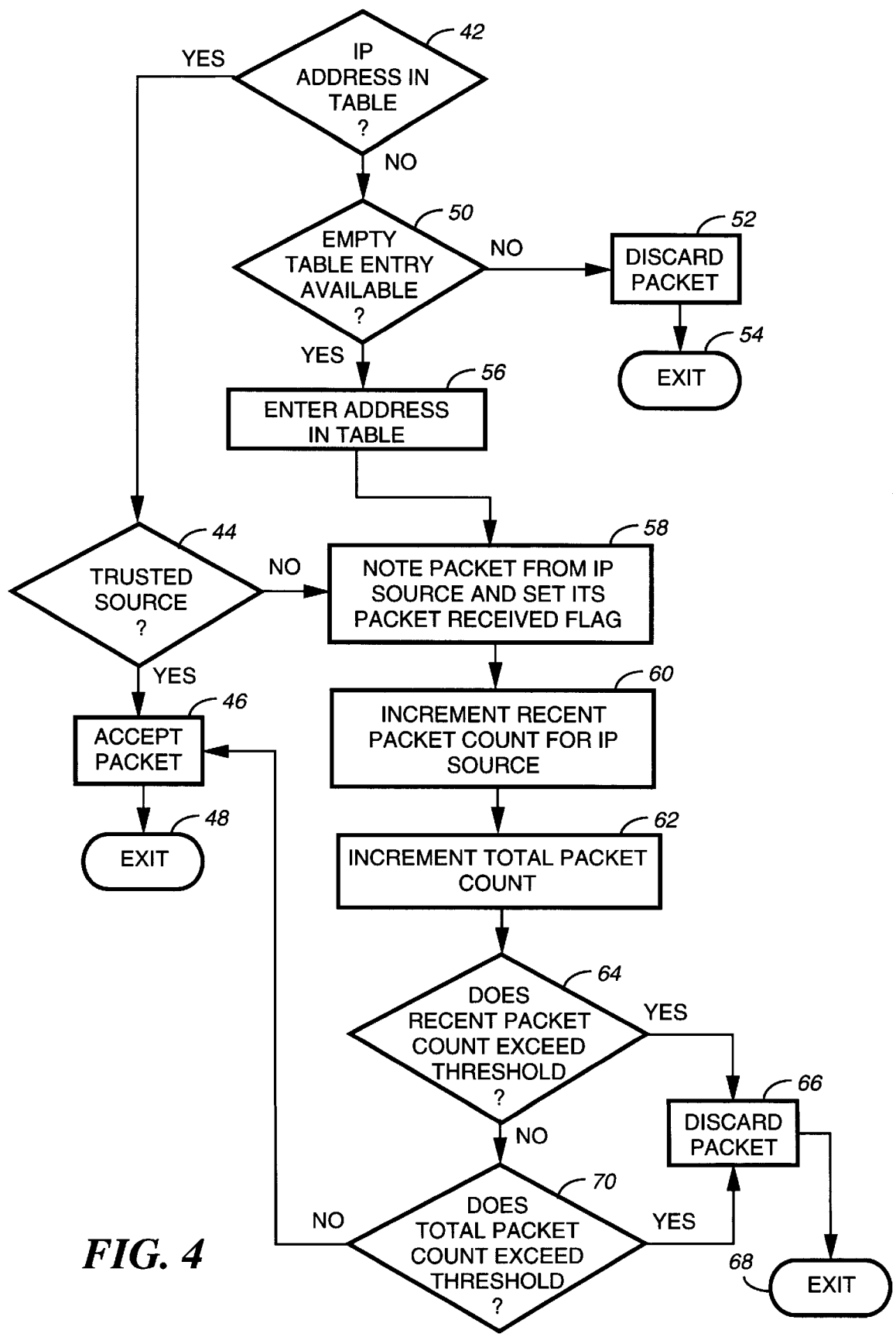
FIG. 4 is a flow chart illustrating how the data packet gate's packet processing preferably operates according to the invention.

FIG. 4 shows the process (indicated by reference numeral 30 in FIG. 3) that is applied to each data packet sent by an external network and received by the gate 20. Some of the notation in FIG. 4 is directed specifically to the Internet, but the substance of this process is applicable to the processing of data packets from any external network.

In the first step 42, a determination is made as to whether the incoming data packet has an IP (Internet Protocol) address that is stored in the source address table 34 (FIG. 3). The table 34 is a memory which stores the addresses of data packet sources, such as the addresses of the external sources 12 and the address of any originator of a data packet that is sent to the internal network 16. Preferably, a source address is first stored in the table 34 on the first occasion of a data packet having been received from that particular source.

If the IP address has been previously stored in the table 34, the process advances to step 44 to determine whether the IP address is on a selected list of trusted sources, i.e., a list of legitimate data packet sources that are not expected to flood the internal network with unwanted data packets, and which are permitted to send unlimited data packets to the internal network. That list may be stored in part of a memory that stores the source address table 34 or in a separate conventional memory.

If the received data packet is determined to be from a trusted source per step 44, the program advances to step 46 where the packet is accepted for distribution to its addressed user 18. This program is then exited at step 48 until the next data packet arrives from an external network, at which time the processing begins anew at step 42 for the next incoming data packet.

If the IP address of an incoming data packet is not found in the table 34 (step 42), the process advances to step 50 to determine whether the source address table 34 has room to receive another source address entry. If the table 34 does not have room for another entry, the data packet being processed is discarded at step 52, and the program is exited at step 54.

If the execution of step 50 found that the table 34 did have room for the entry of another source address, the process would proceed from step 50 to step 56 for entering the data packet's IP address into the source address table 34. In the next step 58, the received data packet is noted as being from a particular IP source and a flag is set to indicate that the particular IP source has sent a data packet to the internal network.

According to one aspect of the invention, a recent packet count is maintained for each IP source that sends data packets to the internal network during a most recent cycle, where a cycle is a time period of several minutes or hours during which the gate 20 receives incoming data packets. In the next step 60, that recent packet count for the present IP source is incremented by one.

The present process also maintains a count representing the count of all data packets received. This count is maintained in the total packet counter 36 (FIG. 3). If that total count exceeds a predetermined upper limit, then data packets from all non-trusted sources are rejected. This action protects the internal network from sophisticated forms of overload attack, as where a router or other device is modified to send large numbers of data packets having different source addresses.

Referring again to FIG. 4, step 62 causes the total packet count to be incremented by one. In the next step 64, a determination is made as to whether the recent packet count (for this particular IP source) exceeds a predetermined threshold. If the answer is affirmative, the process advances to step 66 where the data packet is discarded, and then to step 68 to exit the program.

If the answer to step 64 is negative, the program proceeds to step 70 where a determination is made as to whether the total packet count (incremented in step 62) exceeds its threshold. If the answer is negative, the packet is accepted (step 46). Otherwise, the packet is discarded at step 66.

The program shown in FIG. 4 is executed for every data packet that is received by the gate 20. Consequently, the source address table 34 tends to become full after a period of time, and the recent packet count (step 60) will eventually reach its threshold. Therefore, the program shown in FIG. 4 is preferably executed for a predetermined period of time (e.g. for a cycle of 15 minutes), after which a "clean-up" process is performed. This sequence repeats periodically, with a clean-up process following each cycle of execution of the data packet processing shown in FIG. 4.

Figure 5:
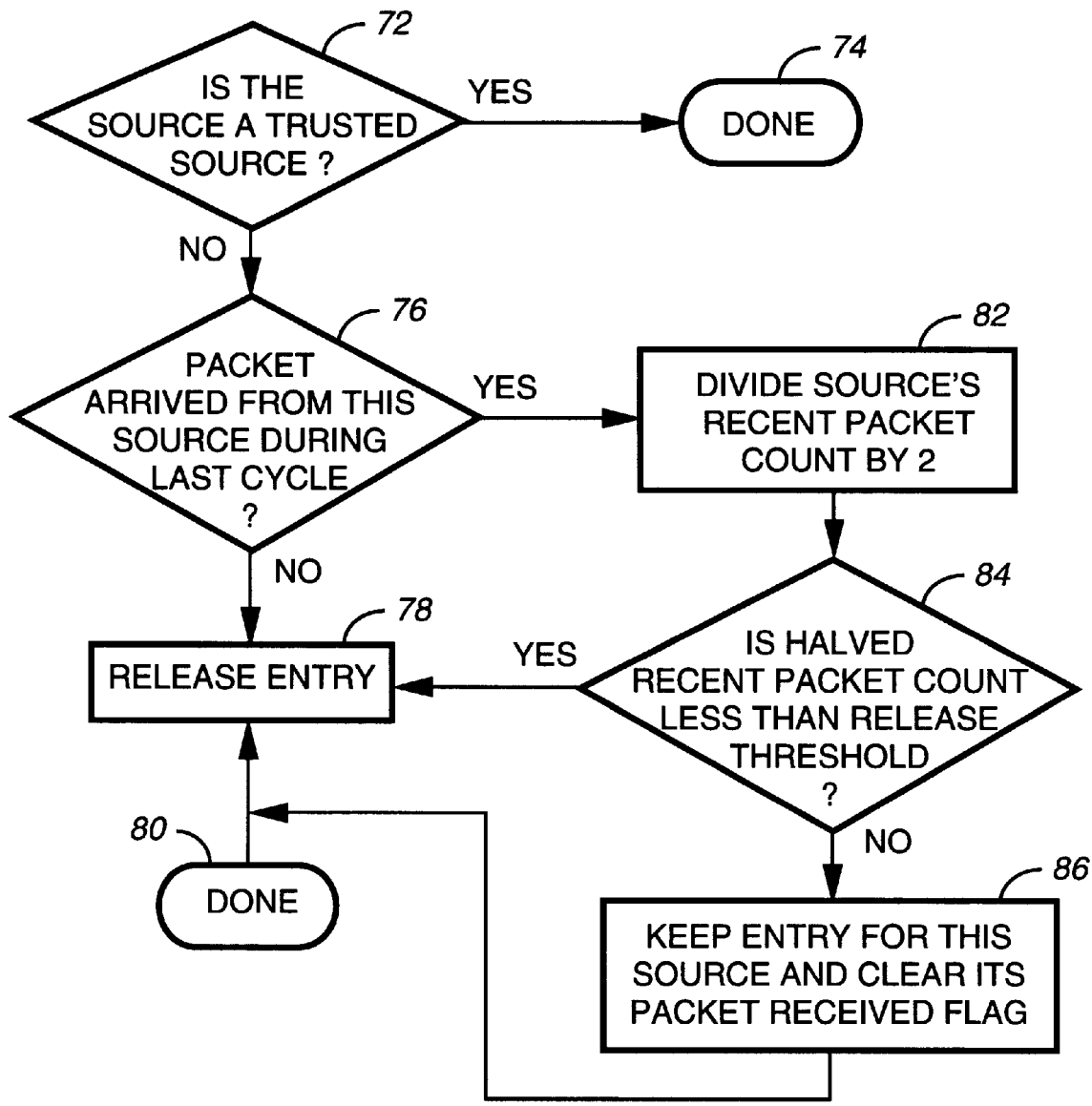
FIG. 5 is a flow chart illustrating how the data packet gate's cleanup process preferably operates.

Referring now to FIG. 5, the illustrated flow chart shows the clean-up process that is executed for each source address that is stored in the source address table 34. The process begins with step 72 to determine whether the source address being examined is the address of a trusted source. If the answer is affirmative, this process is finished (step 74) and no action is taken. For the next source address in the table 34, the process starts again at step 72. If this next source address is not a trusted source, the next step 76 asks whether a data packet was received from this particular source during the last cycle. If the answer is negative, this source address is deleted from the source address table 34 and its position in memory is released to be made available for storing a new source address (step 78) and the process is discontinued per step 80.

Returning to step 76, if a data packet from the source address being examined was received during the last cycle, then the process proceeds to step 82. In this step, the recent packet count for the source address is divided by 2. In the next step 84, a determination is made as to whether the halved recent packet count is less than a release threshold that represents a relatively low count that is characteristic of little activity during the last cycle. If the answer is affirmative, the source address is deleted and its position made available for storing a different source address during the next cycle. If the answer is negative, the source address is maintained as an entry in the table 34 and its packet received flag is cleared at step 86. (This flag was set in step 58, FIG. 4 and tested in step 76, FIG. 5).

Thus, each source address that was relatively active during the last cycle maintains its entry in the source address table 34, and its recent packet count is halved to allow additional data packets to be received during the next cycle without exceeding the threshold in step 64 (FIG. 4). Source addresses that were totally inactive or insufficiently active to meet the release threshold are removed from the source address table 34 to make room for other source addresses that become active during subsequent cycles.

Referring back to step 82, it is not critical that a source's recent packet count be divided by 2. It could be divided by any number N, or otherwise reduced by a predetermined factor.

The above-described method provides a safeguard which prevents accidental or intentional flooding of an internal network by an external network transmitting an excessive number of data packets to the internal network. This technique is particularly important for protecting RF communication networks, such as radio data networks and paging networks, from a data packet assault from an IP source using the Internet, because the outbound channels of these networks can easily become congested. In the case of protecting a paging network, the data packet gate may be situated in a paging terminal. The packet gate may also be a stand-alone device or situated in other equipment such as a web proxy or firewall.

Although the invention has been described in terms of a preferred embodiment, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. In a communication system having an internal network which receives, via a communication link, data packets from packet sources in an external network for further transmission to users in the internal network, a method for protecting the users from receiving an excessive number of data packets originating from the packet sources, comprising:
    a) establishing a data packet gate in the communication link and, at the data packet gate;
    b) receiving a data packet and identifying its packet source;
    c) incrementing a packet count for the identified packet source;
    d) rejecting the data packet if the packet count exceeds a threshold; and
    e) passing the data packet to the internal network if the packet count is below the threshold,
    wherein a data packet includes a source address and further including establishing an address table that stores source addresses, and comparing the source address of a received data packet to the source addresses stored in the address table, and
    wherein if the source address of a received data packet does not match an address stored in the address table, and if the address table does not have room to accept another source address, then the received data packet is rejected; and
    wherein if the source address of a received data packet does not match an address stored in the address table, and if the address table has room to accept another source address, then the source address of the received data packet is stored in the address table.

2. In a communication system having an internal network which receives, via a communication link, data packets from racket sources in an external network for further transmission to users in the internal network, a method for protecting the users from receiving an excessive number of data packets originating from the packet sources, comprising:
    a) establishing a data packet gate in the communication link and, at the data packet gate;
    b) receiving a data packet and identifying its packet source;
    c) incrementing a packet count for the identified packet source;
    d) rejecting the data packet if the packet count exceeds a threshold;
    e) passing the data packet to the internal network if the packet count is below the threshold, wherein the packet count for an identified packet source is incremented as data packets are received during predetermined time cycles, and between predetermined time cycles each packet count is reduced by a predetermined factor, and
    f) establishing an address table that stores source addresses from which data packets have been received, and wherein if a reduced packet count for a source address is below a release threshold, the source address is removed from the address table.

3. In a system having a communication network which receives, via a communication link, data packets from Internet sources for further transmission to receivers within the communication network, a method for protecting the receivers from receiving an excessive number of data packets originating from the Internet sources, comprising:
    a) establishing a data packet gate in the communication link and, at the data packet gate;
    b) receiving a data packet having an Internet source address;
    c) incrementing a first packet count associated with the Internet source address;
    d) incrementing a second packet count representing a total count of data packets received from at least some Internet source addresses; and
    e) rejecting the data packet if either the first packet count exceeds a first threshold, or the second packet count exceeds a second threshold, wherein the packet count for each identified packet source is incremented as data packets are received during predetermined time cycles, and between predetermined time cycles each packet count is reduced by a predetermined factor; and
    f) establishing an address table that stores addresses from which data packets have been received, and wherein if a reduced packet count for a source address is below a release threshold, the source address is removed from the address table.

* * * * *